(12) United States Patent
Lee et al.

(10) Patent No.: US 11,866,879 B2
(45) Date of Patent: *Jan. 9, 2024

(54) LAUNDRY TREATING APPARATUS HAVING A NOZZLE

(71) Applicant: LG Electronics Inc., Seoul (KR)

(72) Inventors: Junghoon Lee, Incheon (KR); Kyungchul Woo, Seoul (KR); Jaehyun Kim, Seoul (KR); Myunghun Im, Seoul (KR); Hyundong Kim, Seoul (KR); Hwanjin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,980

(22) Filed: Nov. 24, 2021

(65) Prior Publication Data

US 2022/0081826 A1 Mar. 17, 2022

Related U.S. Application Data

(63) Continuation of application No. 16/186,218, filed on Nov. 9, 2018, now Pat. No. 11,208,756.

(30) Foreign Application Priority Data

Nov. 9, 2017 (KR) .......................... 10-2017-0148922

(51) Int. Cl.
*D06F 39/08* (2006.01)
*D06F 37/26* (2006.01)
(Continued)

(52) U.S. Cl.
CPC ............ *D06F 39/085* (2013.01); *D06F 21/10* (2013.01); *D06F 37/04* (2013.01); *D06F 37/266* (2013.01);
(Continued)

(58) Field of Classification Search
CPC ...... D06F 39/088; D06F 39/085; D06F 21/10; D06F 37/266
See application file for complete search history.

(56) References Cited

U.S. PATENT DOCUMENTS 11,028,519 B2 6/2021 Lee et al.
11,168,435 B2 11/2021 Kim et al.
(Continued)

FOREIGN PATENT DOCUMENTS

CN 102121186 7/2011
EP 2108731 10/2009
(Continued)

OTHER PUBLICATIONS

Office Action in U.S. Appl. No. 17/330,109, dated Jul. 5, 2022, 14 pages.
(Continued)

*Primary Examiner* — Joseph L. Perrin
*Assistant Examiner* — Irina Graf
(74) *Attorney, Agent, or Firm* — Fish & Richardson P.C.

(57) ABSTRACT

A laundry treating apparatus includes a first nozzle water supply conduit which is disposed, on the gasket, in the one side with respect to the vertical line and guides water discharged through the first circulation port to the pair of first nozzles; and a second nozzle water supply conduit which is disposed, on the gasket, in the other side with respect to the vertical line and guides water discharged through the second circulation port to the pair of second nozzles.

20 Claims, 14 Drawing Sheets

(51) Int. Cl.
  *D06F 37/04* (2006.01)
  *D06F 39/00* (2020.01)
  *D06F 21/10* (2006.01)
(52) U.S. Cl.
  CPC .......... *D06F 39/006* (2013.01); *D06F 39/083* (2013.01); *D06F 39/088* (2013.01)

(56) References Cited

U.S. PATENT DOCUMENTS

| | | | |
|---|---|---|---|
| 11,193,232 | B2 | 12/2021 | Jang et al. |
| 11,208,756 | B2 * | 12/2021 | Lee .................. D06F 37/266 |
| 11,332,871 | B2 | 5/2022 | Kim et al. |
| 11,499,261 | B2 * | 11/2022 | Lee ..................... D06F 23/06 |
| 11,519,121 | B2 * | 12/2022 | Jang .................... D06F 39/083 |
| 2009/0249840 | A1 | 10/2009 | Jo et al. |
| 2010/0181757 | A1 | 7/2010 | Rösch |
| 2011/0083477 | A1 | 4/2011 | Kim et al. |
| 2011/0265525 | A1 | 11/2011 | Gweon |
| 2014/0033449 | A1 | 2/2014 | Im et al. |
| 2014/0096572 | A1 | 4/2014 | Kim et al. |
| 2014/0311189 | A1 | 10/2014 | Im et al. |
| 2015/0128657 | A1 | 5/2015 | Kim et al. |
| 2017/0096769 | A1 | 4/2017 | Kim et al. |

FOREIGN PATENT DOCUMENTS

| | | |
|---|---|---|
| EP | 2634303 | 9/2013 |
| EP | 2719814 | 4/2014 |
| EP | 2808435 | 12/2014 |
| JP | 2006239142 | 9/2006 |
| JP | 2008-194255 | 8/2008 |
| JP | 2010-036016 | 2/2010 |
| JP | 2011250920 | 12/2011 |
| KR | 10-2005-0086204 | 8/2005 |
| KR | 20070090638 | 9/2007 |
| KR | 20100106260 | 10/2010 |
| KR | 10-2011-0036027 | 4/2011 |
| KR | 20110040180 | 4/2011 |
| KR | 10-2015-0121581 | 10/2015 |
| KR | 10-2016-0044901 | 4/2016 |
| WO | WO2011046363 | 4/2011 |
| WO | WO2014037840 | 3/2014 |
| WO | WO 2016/136154 | 9/2016 |
| WO | WO2016162235 | 10/2016 |

OTHER PUBLICATIONS

Australian Office Action in Australian Application No. 2018260955, dated Apr. 24, 2019, 4 pages.
CN Office Action in Chinese Appln. No. 201811328961.X, dated Jul. 29, 2020, 13 pages (with English translation).
Extended European Search Report in European Application No. 18205356.1, dated Mar. 19, 2019, 8 pages.
United States Office Action in U.S. Appl. No. 16/186,321, dated Aug. 13, 2020, 37 pages.
Office Action in Korean Appln. No. 10-2017-0148922, dated Sep. 26, 2022, 9 pages (with English translation).
Notice of Allowance in Korean Appln. No. 10-2017-0148922, dated Jan. 19, 2023, 7 pages (with English translation).
Office Action in U.S. Appl. No. 18/101,796, dated May 19, 2023, 19 pages.
Extended European Search Report in European Appln. No. 23170595.5, dated Sep. 14, 2023, 8 pages.
Office Action in Australian Appln. No. 2022228171, dated Sep. 21, 2023, 7 pages.
Notice of Allowance in Korean Appln. No. 10-2016-0180855, dated Aug. 1, 2023, 4 pages (with English translation).
Office Action in Australian Appln. No. 2022228172, dated Sep. 15, 2023, 5 pages.
Office Action in Australian Appln. No. 2022228184, dated Sep. 1, 2023, 4 pages.
Office Action in Korean Appln. No. 10-2016-0180853, dated Sep. 12, 2023, 8 pages (with English translation).
Office Action in Korean Appln. No. 10-2016-0180854, dated Sep. 17, 2023, 8 pages (with English translation).

* cited by examiner

LAUNDRY TREATING APPARATUS HAVING A NOZZLE

CROSS-REFERENCE TO RELATED APPLICATION

This application is a continuation of U.S. application Ser. No. 16/186,218, filed on Nov. 9, 2018, which claims the priority benefit of Korean Patent Application No. 10-2017-0148922, filed on Nov. 9, 2017 in the Korean Intellectual Property Office, the disclosures of which are incorporated herein by reference.

BACKGROUND OF THE INVENTION

1. Field of the Invention

The present invention relates to a laundry treating apparatus, and more particularly, to a laundry treating apparatus having a nozzle that discharges water circulated along a nozzle water supply conduit discharged from a tub into a drum.

2. Description of the Related Art

Generally, a laundry treating apparatus is an apparatus that separates contaminants from clothing, bedding, etc. (hereinafter, referred to as "laundry") by using physical action such as chemical decomposition of water and detergent and friction between water and laundry.

Such a laundry treating apparatus includes a tub containing water and a drum rotatably installed in the tub to accommodate the laundry. A recent laundry treating apparatus is configured to circulate water discharged from the tub by using a circulation pump and to spray the circulated water (hereinafter referred to as "circulating water") into the drum through a nozzle.

Korean Patent Publication No. KR20100106260A (hereinafter, referred to as '260 patent) discloses a laundry treating apparatus having two circulation nozzles on a gasket. Two water conduits are provided in correspondence with the two circulation nozzles. That is, the '260 patent discloses a structure in which a plurality of circulation nozzles are provided and a single circulation nozzle is coupled to a single water supply conduit (i.e., a structure in which circulating water is supplied to the circulation nozzles by using the same number of water supply conduits as the number of circulation nozzles). Such a structure has a problem in that the number of the water supply conduits is also increased as the number of the circulation nozzles is increased so that a flow path structure is complicated.

Japan Patent Registration No. JP5671687B (hereinafter, referred to as '687 patent) discloses a structure in which a plurality of circulation nozzles are formed in a tub. Circulating water is guided along a single common flow path (nozzle water path) so that a flow path configuration is simplified, but the circulation nozzle and the nozzle water path are provided in a rear surface of a front portion (front portion where an opening is formed) of the tub (water tank 2). Such a structure is difficult to apply to a laundry treating apparatus having a narrow gap between the tub and the drum.

In addition, in the '687 patent, a nozzle water path formed as a separate component from the tub is coupled to the rear surface of the front portion of the tub to form a flow path between the rear surface of the front portion and the nozzle water path. In this case, there is a hygienic problem in that a foreign matter is caught in a gap between the rear surface of the front portion and the nozzle water path.

In addition, in the '687 patent, since the nozzle water path is disposed in the tub, in order to connect a pump disposed outside the tub to the nozzle water path through a circulating water path, it is inevitably necessary to perforate the tub so that the circulating water path can pass through the tub. In this case, it is necessary to thoroughly seal a space between a perforated hole and the circulating water path. However, considering that the tub is a vibrating body, it is difficult to maintain such a sealed state for a long time, which may adversely affect the durability of a product.

In addition, since the '687 patent has a form in which the nozzles are arranged along a single common flow path (nozzle water path), i.e., has a shape in which the nozzles are arranged in the direction of the flow of water, there is a problem in that a deviation occurs in the spray flow rate between a nozzle located on the upstream side and a nozzle located on the downstream side.

SUMMARY OF THE INVENTION

An object of the present invention is to supply circulating water to four or more nozzles provided on the inner circumferential surface of a gasket by using two nozzle water conduits.

Another object of the present invention is to dispose the first nozzle water supply conduit and the second nozzle water supply conduit on the outside of the gasket, thereby preventing the outer surface of the first nozzle water supply conduit and the second nozzle water supply conduit from the contamination due to the detergent water applied into the tub or the drum and improving hygiene.

At least four nozzles are provided on an inner circumferential surface restricting a channel (a channel through which laundry is introduced and removed) defined by the gasket. These four nozzles spray the water discharged from the tub and pumped by the pump into the drum, and is disposed in pairs in both sides based on the channel.

A first nozzle water supply conduit for guiding circulating water (water pumped by the pump) to a pair of first nozzles disposed in one side based on the channel, and a second nozzle water supply conduit for guiding the circulating water to a pair of second nozzles disposed in the other side based on the channel are provided. The first nozzle water supply conduit and the second nozzle water supply conduit are provided in a gasket, the first nozzle water supply conduit is disposed in one side of the channel corresponding to the first nozzles, and the second nozzle water supply conduit is disposed in the other side of the channel corresponding to the second nozzles.

A further object of the present invention is to provide a washing machine having a pair of nozzles in both right and left sides of a gasket, wherein a flow rate supplied to a pair of nozzles provided in the left side and a flow rate supplied to a pair of nozzles provided in the right side are made to be substantially equal, so that the shape of the water flow sprayed through the pair of nozzles provided in the left side and the shape of the water flow sprayed through the pair of nozzles provided in the right side are made symmetrical.

The first nozzle water supply conduit and the second nozzle water supply conduit are respectively coupled to the pump, so that the flow rates introduced into the first nozzle water supply conduit and the second nozzle water supply conduit are substantially equal to each other. Therefore, the flow rate of a pair of first nozzles supplied with circulating water through the first nozzle water supply conduit and the flow rate of a pair of second nozzles supplied with circulating water through the second nozzle water supply conduit are substantially same.

Further, a water flow pattern sprayed through the pair of first nozzles and a water flow pattern sprayed through the pair of second nozzles may be substantially symmetrical.

A further object of the present invention is to provide a method for supplying circulating water to nozzles located on the inner circumferential surface of the gasket from the first and second conduit portions located outside the gasket. A plurality of nozzle water supply ports are formed on the first conduit portion and the second conduit portion, and a plurality of hollows are formed, in the gasket, in the thickness direction of the gasket so as to communicate with the plurality of nozzles, and the plurality of nozzle water supply ports are inserted into the plurality of hollows, so that the circulating water can be supplied to the plurality of nozzles from the plurality of nozzle water supply ports A further object of the present invention is to provide an efficient structure in which a conduit for supplying water circulated by the pump to the nozzles provided in both sides of the balancing weight can be installed without interference with the balancing weight, in a structure in which the balancing weight is provided in the lower side (or below the tub) of a gasket.

The first nozzle water supply conduit and the second nozzle water supply conduit are disposed in both sides of the balancing weight, and a first circulation conduit and a second circulation conduit coupled to the pump, above the balancing weight, are coupled to the first and second nozzle water supply conduits, so that the balancing weight does not become an obstacle in coupling the first and second circulation conduits and the first and second nozzle water supply conduit.

A further object of the present invention is to prevent the first and second nozzle water conduits from being separated from the gasket. The upper ends of the first and second nozzle water supply conduits are interposed, in the upper portion of the tub, between the upper balancing weight disposed around the gasket and the gasket so that operation of the upper ends of the first and second nozzle water supply conduits to move away from the gasket is restrained by the upper balancing weight.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
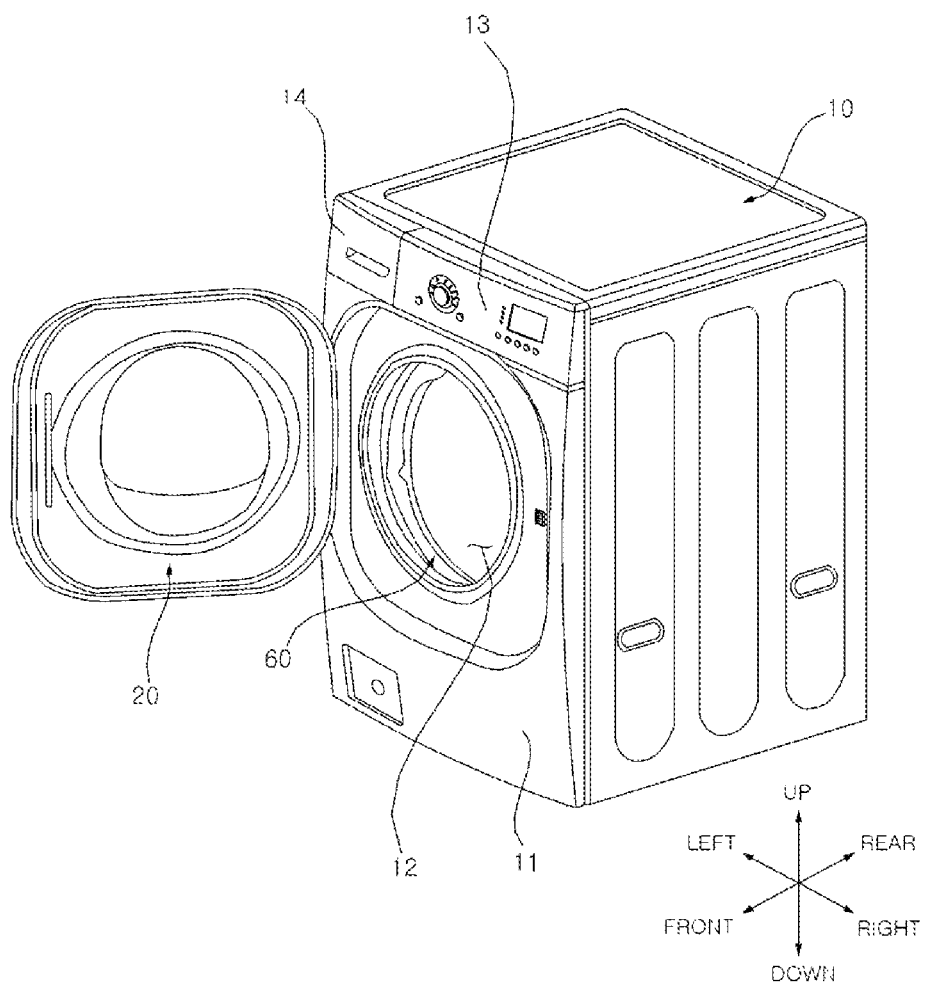
FIG. 1 is a perspective view of a laundry treating apparatus according to an embodiment of the present invention.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 2:
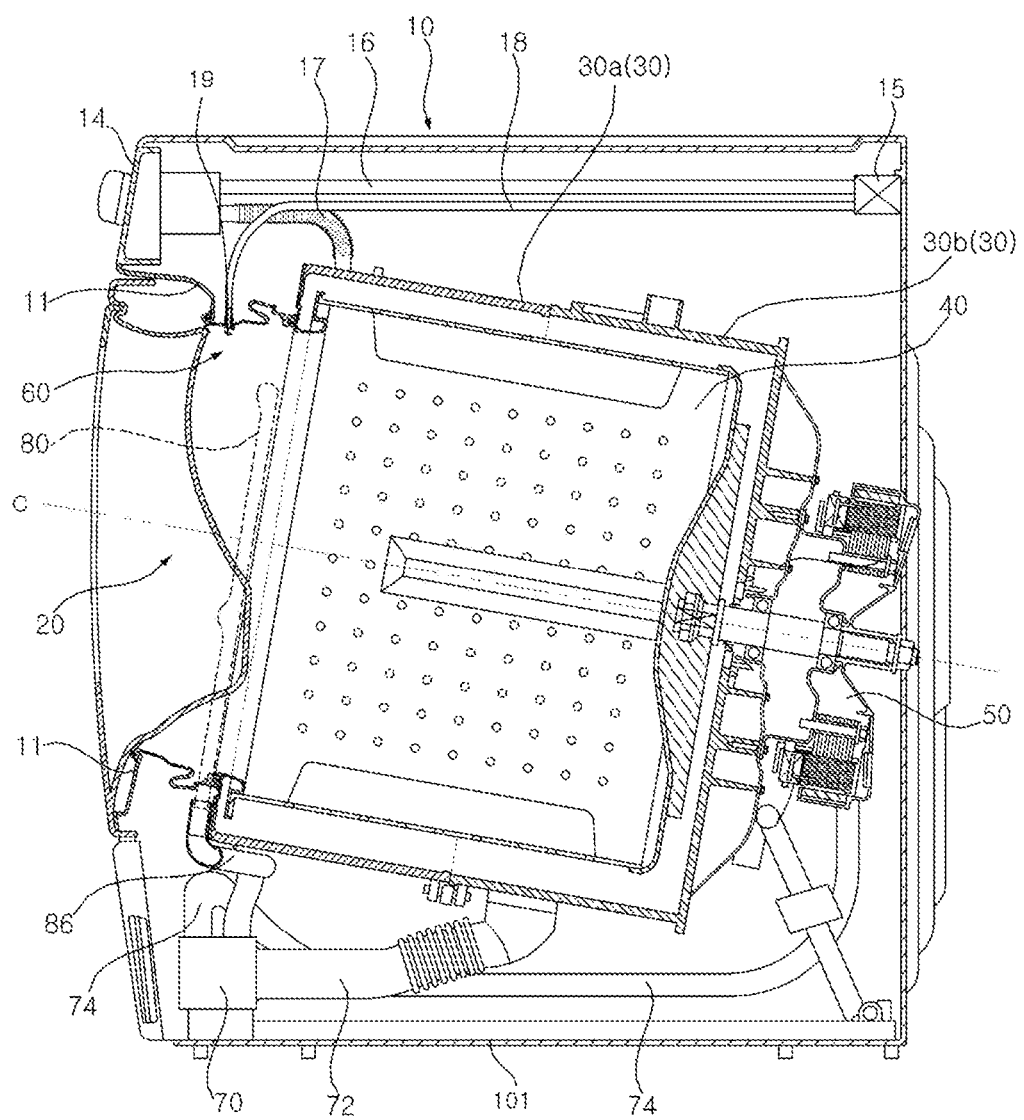
FIG. 2 is a side sectional view of the laundry treating apparatus shown in FIG. 1.
Figure 3:
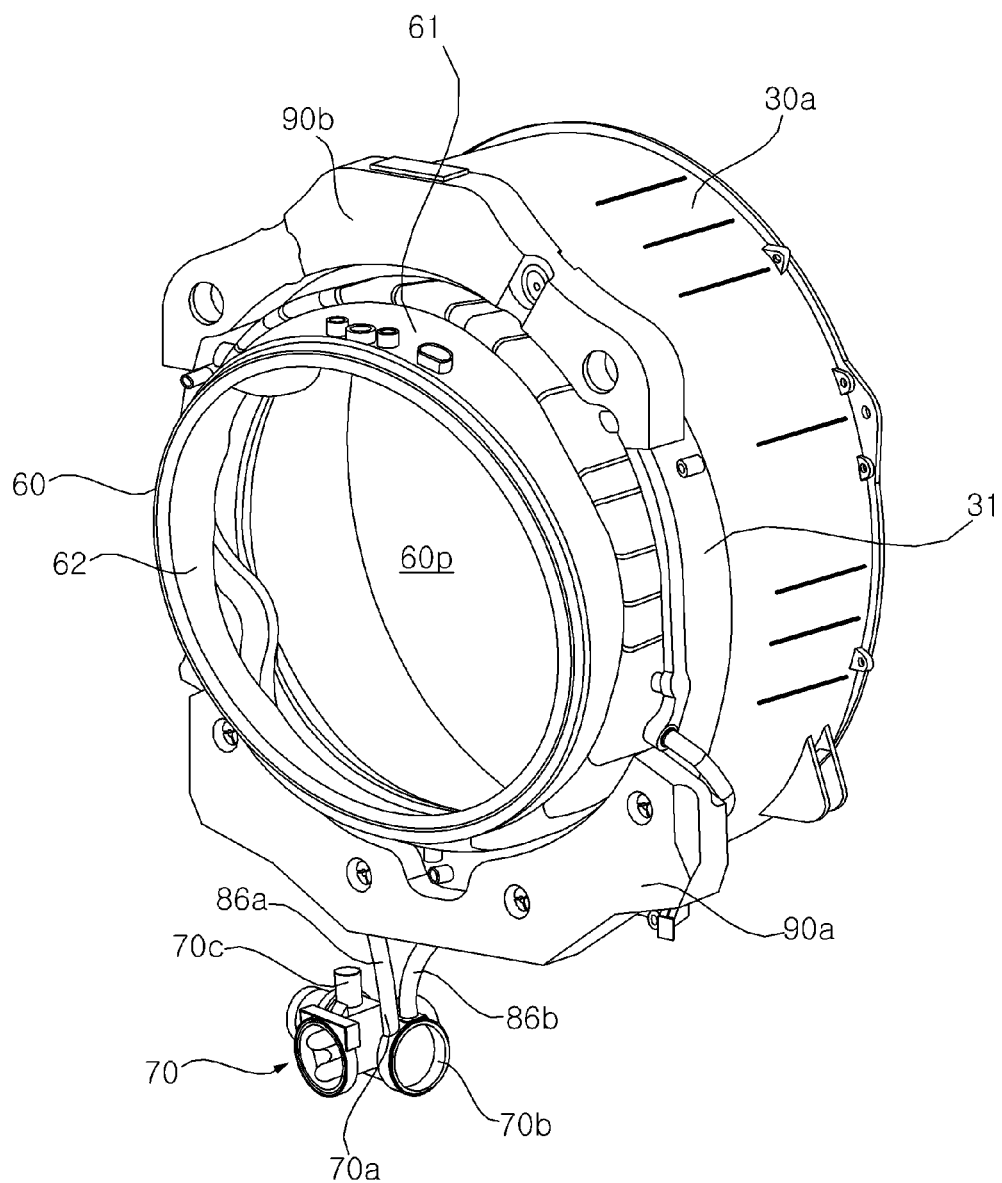
FIG. 3 is a partial perspective view showing a part of the laundry treating apparatus shown in FIG. 1.
Figure 4:
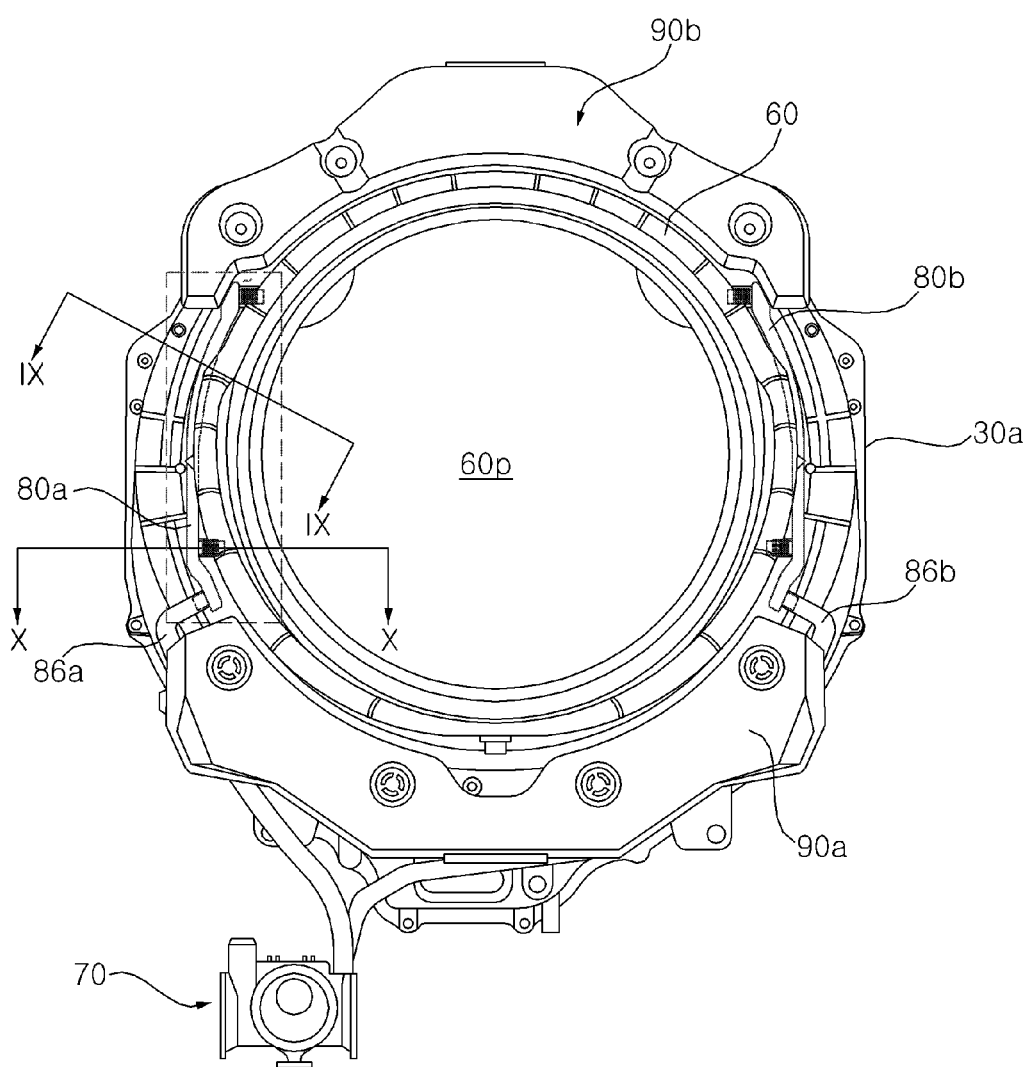
FIG. 4 is a front view of an assembly shown in FIG. 3.
Figure 5:
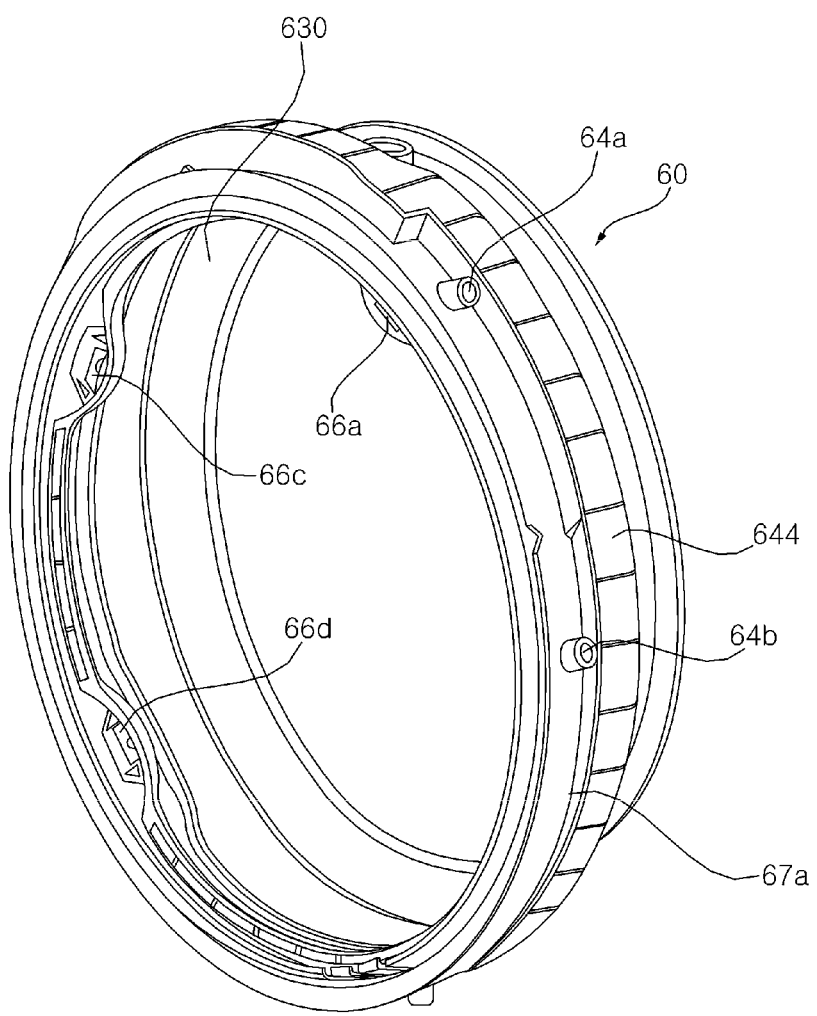
FIG. 5 is a perspective view of a gasket.
Figure 6:
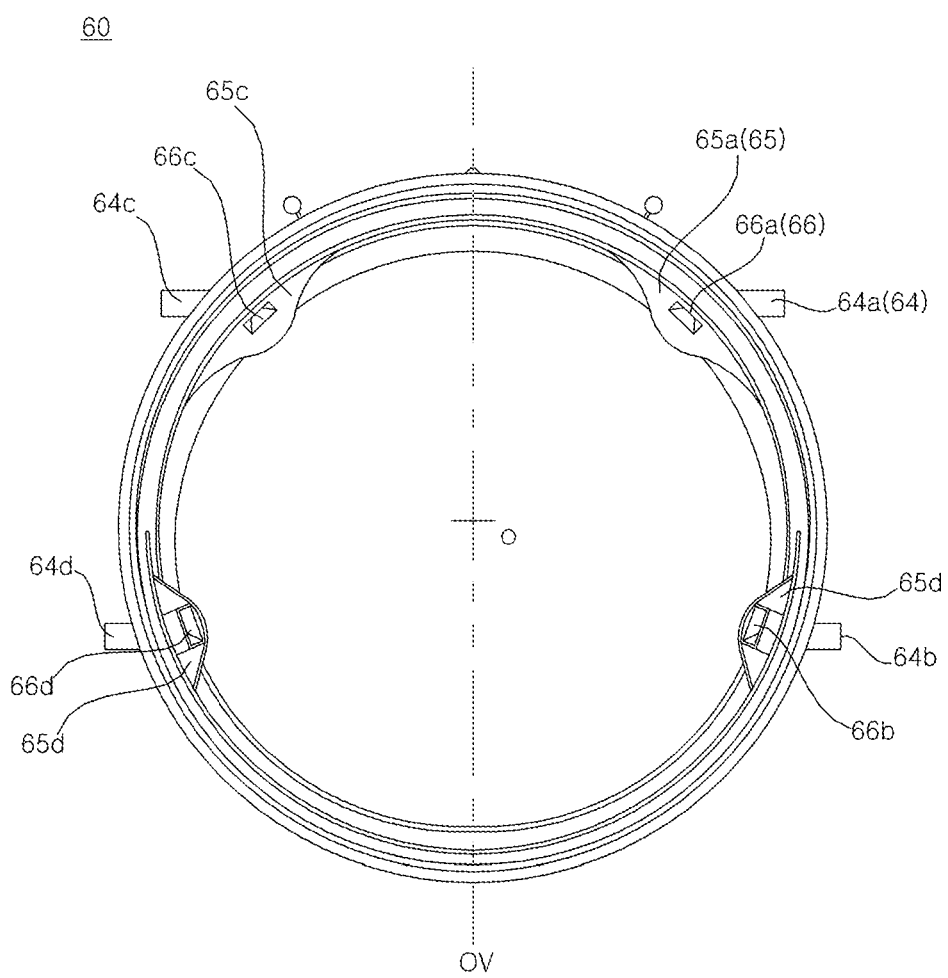
FIG. 6 is a rear view of the gasket.
Figure 7:
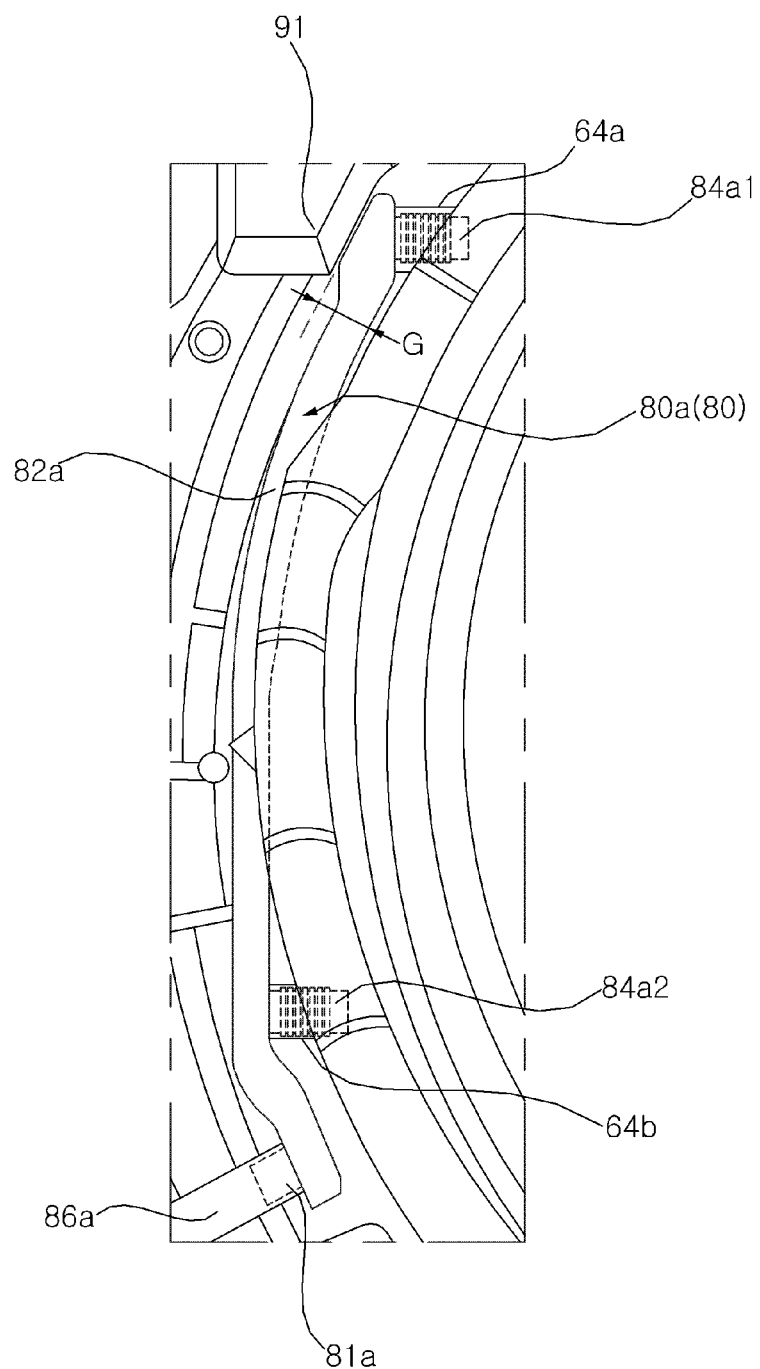
FIG. 7 is an enlarged view of a portion indicated by a dotted line in FIG. 4.
Figure 8:
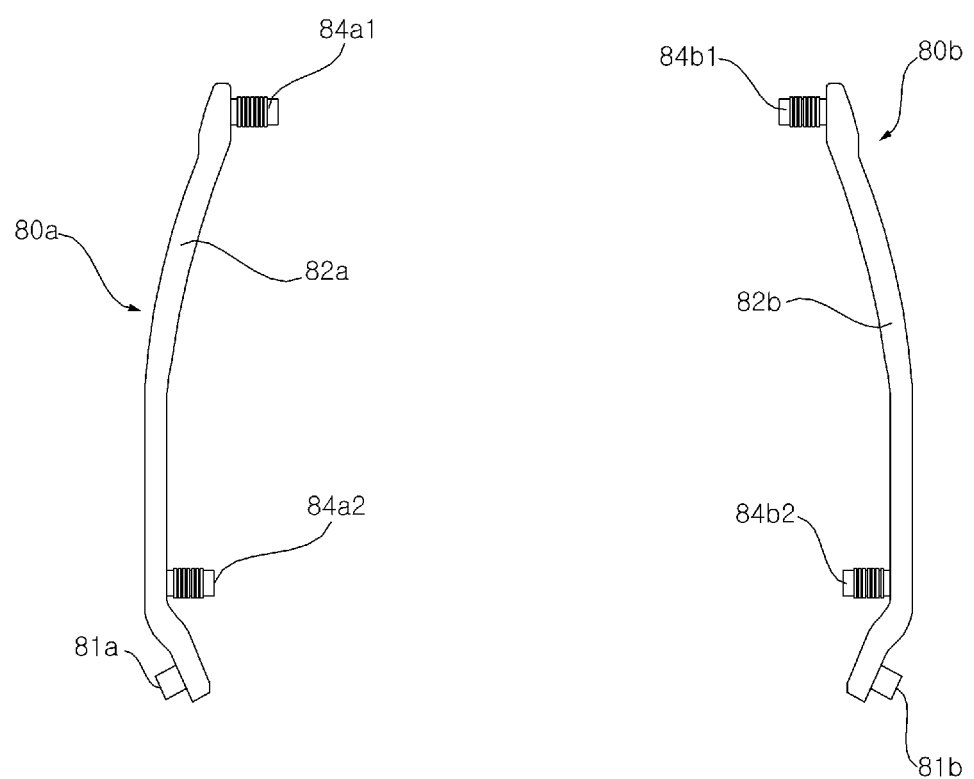
FIG. 8 is a perspective view illustrating a first nozzle water supply conduit and a second nozzle water supply conduit installed in the gasket.
Figure 9:
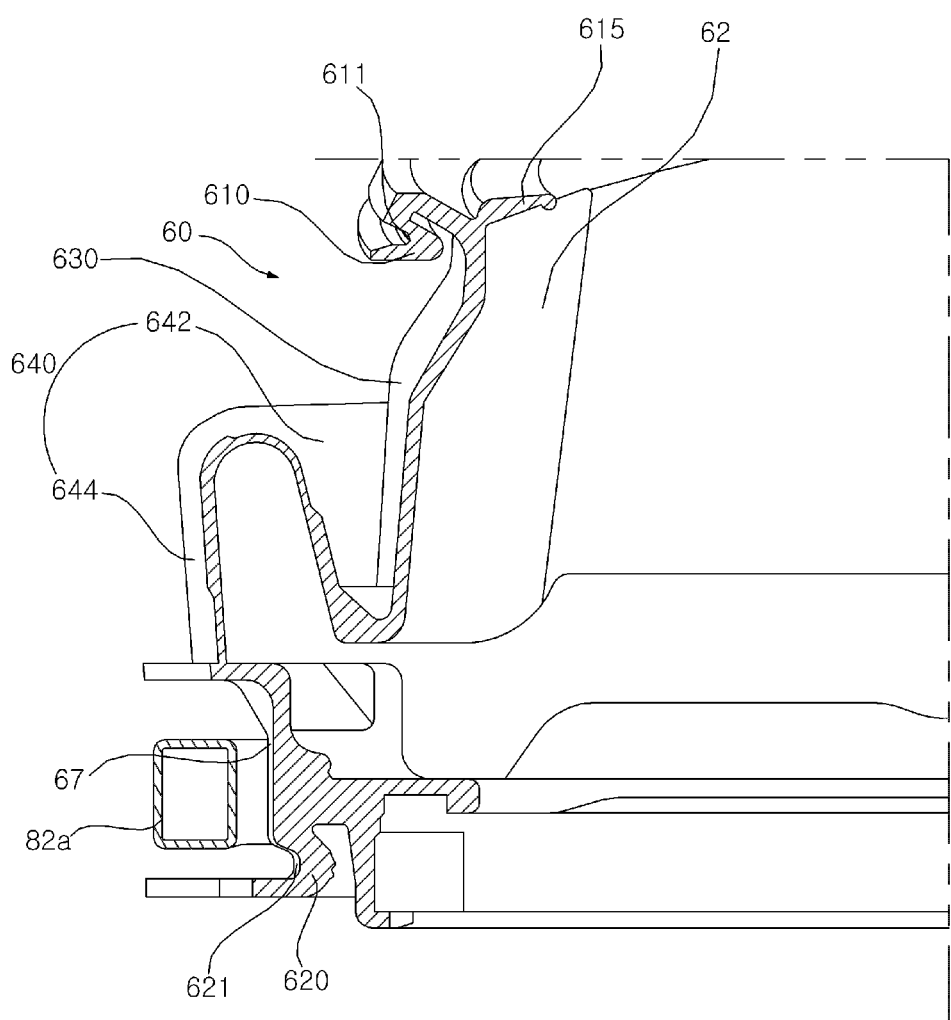
FIG. 9 is a cross-sectional view taken along a line IX-IX of FIG. 4.
Figure 10:
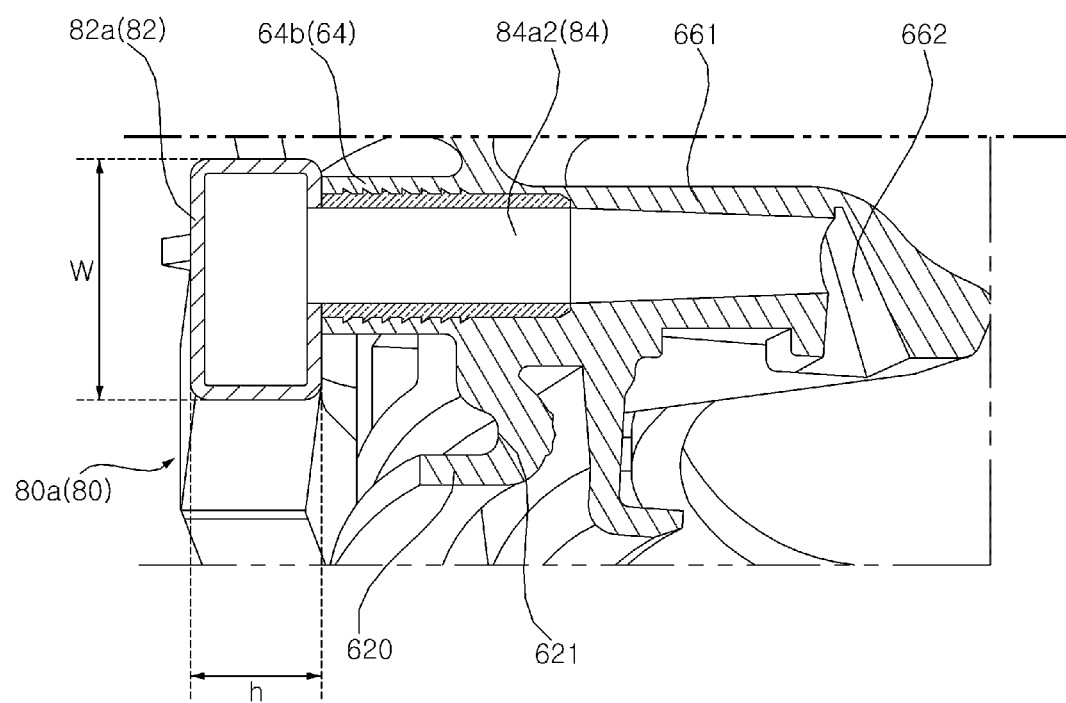
FIG. 10 is a cross-sectional view taken along a line X-X of FIG. 4.

FIG. 1 is a perspective view of a laundry treating apparatus according to an embodiment of the present invention. FIG. 2 is a side sectional view of the laundry treating apparatus shown in FIG. 1. FIG. 3 is a partial perspective view showing a part of the laundry treating apparatus shown in FIG. 1. FIG. 4 is a front view of an assembly shown in FIG. 3. FIG. 5 is a perspective view of a gasket. FIG. 6 is a rear view of the gasket. FIG. 7 is an enlarged view of a portion indicated by a dotted line in FIG. 4. FIG. 8 is a perspective view illustrating a first nozzle water supply conduit and a second nozzle water supply conduit installed in the gasket. FIG. 9 is a cross-sectional view taken along a line IX-IX of FIG. 4. FIG. 10 is a cross-sectional view taken along a line X-X of FIG. 4.

Referring to FIG. 1 and FIG. 2, a laundry treating apparatus according to an embodiment of the present invention includes a casing 10 which forms an outer appearance, a tub 30 which is disposed in the casing 10 and stores fluid, a drum 40 which is rotatably installed in the tub 30 and into which laundry is inputted, and a motor 50 which rotates the drum 40.

A front panel 11 provided with an input port 12 is disposed on a front surface of the casing 10, and, on the front panel 11, a door 20 for opening and closing the input port 12 is disposed and a dispenser 14 into which detergent is dispensed may be installed. The casing 10 may be provided with a control panel 13 for receiving a command for operating the laundry treating apparatus.

Meanwhile, the tub 30 may be formed as a single tub body, or may be formed by fastening first and second tub bodies 30a and 30b to each other. In an embodiment of the present invention, it is illustrated that the first and second tub bodies 30a and 30b are fastened to form the tub 30. Hereinafter, the first tub body 30a will be referred to simply as a 'tub 30'.

An annular gasket 60 is provided to form a channel 60P connecting the input port 12 and the opening of the tub 30. A plurality of nozzles 66a, 66b, 66c, 66d for spraying water into the drum 40 is provided on the inner circumferential surface 62 of the gasket 60 defining the channel 60P.

A water supply valve 15, a water supply conduit 16, and a water supply hose 17 may be installed in the casing 10. The fluid that passed through the water supply valve 15 and the water supply conduit 16 during water supply may be mixed with the detergent in the dispenser 14, and then supplied to the tub 30 through the water supply hose 17.

Meanwhile, a direct water supply conduit 18 is coupled to the water supply valve 15 so that the fluid can be directly supplied into the tub 30 through the direct water supply conduit 18 without being mixed with the detergent. A direct water nozzle 19 for spraying the water supplied through the direct water supply conduit 18 into the drum 40 may be provided.

The pump 70 pumps water discharged from the tub 30 and is coupled to the tub 30 through a discharge hose 72. The pump 70 may be positioned below the tub 30. The pump 70 may be fixed on a base 101 forming the bottom of the casing 10.

The pump 70 may discharge the circulating water through a first circulation port 70a and a second circulation port 70b. More specifically, the pump 70 may include a pump casing which forms a chamber into which water discharged through the discharge hose 72 is introduced from the tub 30, an impeller which is rotatably installed in the pump casing, and a pump motor which rotates the impeller. In the pump casing, an input port coupled to the discharge hose 72 is communicated with the chamber, and the circulation port 70a, 70b and a drain port 70c that discharge water pumped by the impeller may be formed. The circulation port 70a, 70b may be coupled to the circulation conduit 86a, 86b, and the drain port 70c may be coupled to a discharge conduit 74.

The water in the chamber may be selectively supplied to the circulation port or the drain port according to the rotation direction of the impeller. That is, when the impeller rotates in the forward direction, the fluid is discharged through the circulation port, and when the impeller rotates in the reverse direction, the fluid may be discharged through the drain port. Since a method of implementing circulation or drain of water according to the rotation direction of the impeller while using a single pump is well known, a further explanation will be omitted.

The pump motor may be a variable speed motor capable of controlling the rotation speed and may be a brushless direct current motor (BLDC) motor. Obviously, the rotation direction of the BLDC motor can also be controlled.

The above described pump 70 serves as a circulation pump circulating the fluid and a drain pump discharging the fluid to the outside. Alternatively, the circulation pump and the drain pump may be separately provided. When the circulation pump and the drain pump are separately provided, it is obvious that the drain conduit 74 is coupled to the drain pump and the circulation conduit 86 is coupled to the circulation pump.

The circulation conduit 86 may be made of an amorphous soft material. That is, the circulation conduit 86 can be deformed by an external force and may be made of rubber or soft synthetic resin (or deformable material).

A pair of nozzle water supply conduit 80 for guiding water pumped by a pump 70 is provided. The pair of nozzle water supply conduits 80 include a first nozzle water supply conduit 80a and a second nozzle water supply conduit 80b disposed in both sides based on the channel 60P of the gasket 60. Specifically, as shown in FIG. 4, when viewed from the front, the first nozzle water supply conduit 80a is disposed in one side with respect to a vertical line OV passing through the center O of the gasket 60, and the second nozzle water supply conduit 80b is disposed in the other side with respect to the vertical line OV.

The water discharged through the first circulation port 70a of the pump 70 is guided by the first nozzle water supply conduit 80a and the water discharged through the second circulation port 70b is guided by the second nozzle water supply conduit 80b. The first nozzle water supply conduit 80a and the second nozzle water supply conduit 80b may have substantially the same structure and may be disposed symmetrically in both the left and right sides with respect to the gasket 60.

Each nozzle water supply conduit 80a, 80b may include a circulation conduit connecting port 81 through which water discharged from the pump 70 flows into, a conduit portion 82 which guides water introduced through the circulation conduit connecting port 81, and a plurality of nozzle water supply ports 83, 84 branched from the conduit portion 82. Hereinafter, those formed in the first nozzle water supply conduit 80a are referred to as a first circulation conduit connection port 81a, a first conduit portion 82a, and a first nozzle water supply port 84a, and those formed in the second nozzle water supply conduit 80b are referred to as a second circulation conduit connection port 81b, a second conduit portion 82b, and a second nozzle water supply port 84b.

The nozzle water supply conduit 80 is fixed to a gasket 60. In some cases, it is not possible to spray water into the drum 40 even when a nozzle is installed in the tub 40 due to various structural reasons such as a case where, in particular, the front end (i.e., the opening of the drum 40) of the drum 40 is located close to the opening of the tub 30 (e.g., a structure in which the opening of the drum 40 is located in the same plane as the opening of the tub 30, or protrudes forward through the opening of the tub 30), and further, the opening of the drum 40 is located inside the opening of the tub 30 when viewed from the front. Therefore, it is preferable that the nozzle 66a, 66b, 66c, and 66d is formed in the gasket 60 which does not have an obstacle to the spraying of water into the drum 40, and the nozzle water supply conduit 80 for supplying water to the nozzle is also installed in the gasket 60.

The water discharged from the pump 70 flows into the circulation conduit connection port 81. The circulation conduit connection port 81 may be coupled to the pump 70 by the circulation conduit 86a. The pump 70 may be provided with circulation ports 70a and 70b through which the circulating water is discharged in correspondence with the number of the nozzle water supply conduits 80. In the embodiment, the pump 70 has a first circulation port 70a and a second circulation port 70b, and the first circulation port 70a is coupled to the circulation conduit connection port 81a of the first nozzle water conduit 80a by a first circulation conduit 86a, and the second circulation port 70b is coupled to the circulation conduit connection port 81b of the second nozzle water supply conduit 80b by a second circulation conduit 86b.

The conduit portion 82 is disposed outside the channel 60P defined by the gasket 60, and guides the water introduced through the circulation conduit connection port 81 upward. The conduit portion 82 forms a channel communicated with the circulation conduit connection port 81, and the flow path is bent substantially in a shape corresponding to the outer circumferential surface of the gasket 60 and may be extended in the vertical direction.

A plurality of nozzle water supply ports 84 are branched from the conduit portion 82. The circulating water transferred along the conduit portion 82 is discharged through the plurality of nozzle water supply ports 84. These nozzle water supply ports 84 are branched from the conduit portion 82 in the upper side of the circulation conduit connection port 81. That is, the inlet of the nozzle water supply port 84 (i.e., the portion where the nozzle water supply port 84 is coupled to the conduit portion 82) is positioned above the outlet (i.e., the portion where the circulation conduit connection port 81 is coupled to the conduit portion 82) of the circulation conduit connection port 81.

The plurality of nozzle water supply ports 84 include two nozzle water supply ports 84 formed at different heights. Hereinafter, one of the two nozzle water supply ports 84 positioned below side is referred to as a lower nozzle water supply port 84a1, 84b1, and one positioned above the lower nozzle water supply port 84a1, 84b1 is referred to as an upper nozzle water supply ports 84a2, 84b2.

The circulation conduit connection port 81 protrudes in a direction opposite to the nozzle water supply ports 84 with respect to the conduit portion 82. The circulation conduit connection port 81 may be opened in a direction in which the inlet communicating with the circulation conduit 86 is away from the gasket 60. Since the spraying pressure of the water flow discharged from the nozzle water supply ports 84 acts as a reaction force, the conduit portion 82 receives a force in a direction opposite to the discharge direction of the water flow (i.e., the direction in which it is detached from the gasket 60).

The circulation conduit connection port 81 protrudes in the direction opposite to the nozzle water supply ports 84 from the conduit portion 82 so that the water flow introduced through the circulation conduit connection port 81 acts in a direction to bring the conduit portion 82 into close contact with the gasket 60. Therefore, it is possible to prevent the nozzle water supply ports 84 from being detached from the port insertion tube 64 described later.

An opening 32 is formed in the front surface 31 of the tub 30 so as to correspond to the input port 12 formed in the front panel 11 forming the front surface of the casing 10. The gasket 60 is disposed between the rim of the input port 12 of the front panel 11 and the rim of the tub 30 forming the opening 32. The gasket 60 is formed of a flexible material such as rubber and has a substantially cylindrical shape.

The front edge of the gasket 60 is coupled to the rim of the input port 12 of the front panel 11, and the rear edge of the gasket 60 is coupled to the rim of the opening of the tub 30 so that a gap between the tub 30 and the front panel 11 is sealed. When the door 20 is closed, the door 20 and the front end of the gasket 60 come into close contact with each other and a gap between the door 20 and the gasket 60 is sealed so that the leakage of the fluid is prevented.

In more detail, referring to FIG. 9 and FIG. 10, the gasket 60 may include a casing coupling portion 610 coupled to circumference of the input port 12 of the casing 10, a tub coupling portion 610 coupled to circumference of the opening of the tub 30, and an extension portion 650 extended from between the casing coupling portion 610 and the tub coupling portion 620.

Each of the casing coupling portion 610 and the tub coupling portion 620 is formed in an annular shape. The extension portion 650 may have an annular rear end portion coupled to the tub coupling portion 620 from an annular front end portion coupled to the casing coupling portion 610, and may be formed in a tubular shape extended from the front end to the rear end.

In the front panel 11 of the casing 10, the circumference of the input port 12 is curled outward, and the casing coupling portion 610 may be fitted in a concave portion formed by the curled portion.

An annular groove 611 through which a wire is wound may be formed in the casing coupling portion 610. After the wire is wound along the groove 611, the both ends of the wire are bounded so that the casing coupling portion 610 is firmly fixed to the circumference of the input port 12.

The circumference of the opening of the tub 30 is curled outward, and the tub coupling portion 620 is fitted into a concave portion formed by the curled portion. An annular groove 621 through which a wire is wound may be formed in the tub coupling portion 620. After the wire is wound along the groove 621, the both ends of the wire are bounded so that the tub coupling portion 620 is firmly coupled to the circumference of the opening of the tub 30.

Meanwhile, the casing coupling portion 610 is fixed to the front panel 11, but the tub coupling portion 620 is displaced according to the movement of the tub 30. Therefore, the extension portion 650 should be deformable in response to the displacement of the tub coupling portion 620. In order to facilitate such deformation, in the gasket 60, a folded portion 640 which is folded as the tub 30 is moved in the direction (or radial direction) in which the tub 30 is moved by the eccentricity may be formed in a section (or an extension portion 650) between the casing coupling portion 610 and the tub coupling portion 620.

Specifically, the extension portion 650 may include a cylindrical rim portion 630 extended rearward from the casing coupling portion 610, and the folded portion 640 formed between the rim portion 630 and the tub coupling portion 620.

The gasket 60 may further include a door close portion 615 which is bent inward from the front end of the rim portion 630 and brought into close contact with the rear surface of the door 20 in the inside of the input port 12 in a state in which the door 20 is closed.

Meanwhile, the drum 40 is vibrated (i.e., the rotation center line C (see FIG. 2) of the drum 40 is moved) during a rotation process, and thus, the center line (approximately, the same as the rotation center line C of the drum 40) of the tub 30 is also moved. At this time, the moving direction (hereinafter, referred to as "eccentric direction") has a radial component.

The folded portion 640 is folded or unfolded when the tub 30 moves in the eccentric direction. The folded portion 640 may include an inner diameter portion 642 which is bent from the rim portion 630 toward the casing coupling portion 610 and an outer diameter portion 644 which is bent from the inner diameter portion 642 toward the tub coupling portion 620, and coupled to tub coupling portion 620. When the center of the tub 30 is moved in the eccentric direction, if a part of the folded portion 640 is folded, a gap between the inner diameter portion 642 and the outer diameter portion 644 is reduced at a folded portion, whereas the gap between the inner diameter portion 642 and the outer diameter portion 644 is increased at the other portion where the folded portion 640 is unfolded.

A first seating groove 67a and a second seating groove 67b extended along the circumferential direction may be formed on an outer circumferential surface 61 of the gasket 60. The first seating groove 67a and the second seating groove 67b are formed in both sides of a channel 60P of the gasket 60, and are preferably symmetrical. At least a part of a first conduit portion 82a may be seated in the first seating groove 67a and at least a part of a second conduit portion 82b may be seated in the second seating groove 67b.

At least one of a pair of first port insertion conduits 64a and 64b may be positioned in the first seating groove 67a.

At least one of a pair of second port insertion conduits 64*c* and 64*d* may be positioned in the second seating groove 67*b*.

Referring to FIG. 10, the cross-section of at least one of the first conduit portion 82*a* and the second conduit portion 82*b* may have a shape in which the height h defined in the radial direction of the gasket 60 is smaller than the width w defined in the longitudinal direction of the channel 60P of the gasket 60.

The first seating groove 67*a* and the second seating groove 67*b* may be formed in the outer diameter portion 644 of the gasket 60. The deformation of the gasket 60 in the folded portion 640 is mainly accomplished at a portion where the inner diameter portion 642 and the outer diameter portion 644 meet. Even if the vibration of the tub 30 occurs, the outer diameter portion 644 mainly performs translation motion, but it is not easily deformed (e.g., distorted) and maintains a stable shape. Therefore, by forming the first and second seating grooves 67*a* and 67*b* in the outer diameter portion 644, even if the vibration of the tub 30 is generated, the shape of the first and second seating grooves 67*a* and 67*b* can be maintained, and thus, the first conduit portion 82*a* and the second conduit portion 82*b* can be stably retained.

On the front surface 31 of the tub 30, a lower balancing weight 90*a* may be provided substantially in the lower side of the channel 60P. The lower balancing weight 90*a* may achieve the form of wrapping a portion of the channel 60P in a position lower than the center of the channel 60P. Particularly, the lower balancing weight 90*a* may occupy the vertical downward area of the lowermost of the gasket 60.

The first nozzle water supply conduit 80*a* and the second nozzle water supply conduit 80*b* may be disposed in both sides based on the lower balancing weight 90*a*. That is, when viewed from the front, the first nozzle water supply conduit 80*a* and the second nozzle water supply conduit 80*b* may be disposed in the left and right sides of the lower balancing weight 90*a*, respectively.

The lower end of the conduit portion 82*a*, 82*b* of each nozzle water supply conduit 80*a* and 80*b* may be positioned above the lower balancing weight 90*a*. The circulation conduit connection port 81*a*, 81*b* protrude substantially radially outward from the conduit portion 82*a*, 82*b*. Therefore, the lower balancing weight 90*a* does not obstruct the coupling of the circulation conduit connection port 81*a*, 81*b* and the circulation conduit 82*a*, 82*b*.

The upper balancing weight 90*b* may be further provided, and at least a portion of the conduit portion 82*a*, 82*b* may be extended along the outer circumference of the gasket 60 between the lower balancing weight 90*a* and the upper balancing weight 90*b*. The upper balancing weight 90*b* is mounted on the front surface 31 of the tub 30, and may be disposed substantially on the upper side (i.e., on the opposite side of the lower balancing weight 90*a* based on the channel 60P) of the channel 60P. The upper balancing weight 90*b* may achieve the form of wrapping a portion of the channel 60P in a position higher than the center of the channel 60P.

The closed upper end of the conduit portion 82 may be disposed between the upper balancing weight 90*b* and the gasket 60. A certain gap G may be formed between the outer circumferential surface of the gasket 60 and the upper balancing weight 90*b*, and the upper end portion of the conduit portion 82 may be positioned within the gap G. The upper nozzle water supply port 84*a*1, 84*b*1 may protrude from the upper end portion. When the upper nozzle water supply port 84*a*1, 84*b*1 attempts to be detached from the port insertion conduit 64*a*, 64*c* (i.e., when the upper nozzle water supply port 84*a*1, 84*b*1 receives force in a direction away from the gasket 60), the upper balancing weight 90*b* restrains the movement while being in contact with the upper end of the conduit portion 82, thereby preventing the detachment of the nozzle water supply conduit 80.

The conduit portion 82 may be made of hard material in comparison with the circulation conduit 86. The conduit portion 82 may be made of high-density polyethylene (HDPE) or polypropylene (PP).

Meanwhile, the area of a cross-section of flow path (a cross-section of the path guiding the water) of the transfer path 82 may be gradually reduced from the lower portion of the transfer path 82 to the upper portion. The width of the cross-section of the flow path may be gradually decreased from the lower portion of the transfer path 82 to the upper portion.

Since the cross section of the flow path becomes narrower toward the upper side, the flow velocity may be increased, and the water pressure drop due to the position rise can be compensated by the increase of flow velocity so that the upper nozzle 66*a*, 66*c* can uniformly spray water with the same water pressure as the lower nozzle 66*b*, 66*d*.

Meanwhile, a first upper nozzle 66*a* receiving water through the first conduit portion 82*a* may spray water downward toward the inside of the drum 40, and a first lower nozzle 66*b* receiving water through the first conduit portion 82*a* may spray water upward toward the inside of the drum 40.

Similarly, the second upper nozzle 66*c*, which receives water through the second conduit portion 82*b*, may spray water downward toward the inside of the drum 40, and the second lower nozzle 66*d*, which receives water through the second conduit portion 82*b*, may spray water upward toward the inside of the drum 40.

The lower nozzle 66*b*, 66*d*, which is positioned in a relatively low position to achieve a water supply at a high pressure, sprays water upward, and the upper nozzle 66*a*, 66*c*, which is positioned in a relatively high position to achieve a water supply at a low pressure, so that the spray pressures of the upper nozzle 66*a*, 66*c* and the lower nozzle 66*b*, 66*d* can be substantially uniform.

The plurality of nozzle water supply ports 83 and 84 are branched from the conduit portion 82, respectively. The circulating water (i.e., the water pumped by the pump 70) transferred along the conduit portion 82 is discharged through the plurality of nozzle water supply ports 83 and 84. These nozzle water supply ports 83 and 84 are branched from the conduit portion 82 at the upper side of the circulation conduit connecting port 81. That is, the inlet of the nozzle water supply port 83, 84 (i.e., the portion where the nozzle water supply port 83, 84 is coupled to the conduit portion 82) is positioned above the outlet of the circulation conduit connecting port 81 (i.e., the portion where the circulation conduit connecting port 81 is coupled to the conduit portion 82).

Hereinafter, among the plurality of nozzle water supply ports 83 and 84, one formed in the first conduit portion 82*a* is referred to as a first nozzle water supply port 84*a* and 84*b*, and one formed in the second conduit portion 82*b* is referred to as a second nozzle water supply port 84*c* and 84*d*.

In the present embodiment, two first nozzle water supply ports 84*a* and 84*b* and two second nozzle water supply ports 84*c* and 84*d* are provided, but the number of the nozzle water supply ports 84*a*, 84*b*, 84*c* and 84*d* is not limited thereto. In addition, hereinafter, among two nozzle water supply ports 84*a*1, 84*a*2, 84*b*1, 84*b*2 positioned at different heights on one conduit portion 82*a*, 82*b*, one positioned in a lower side is referred to as a lower nozzle water supply port 84*a*1, 84*b*1, and one positioned above the lower nozzle water supply port 84*a*1, 84*b*1 is referred to as an upper nozzle water supply port 84*a*2, 84*b*2. In the embodiment, a first lower nozzle water supply port 84*a*1 and a first upper nozzle water supply port 84*a*2 are formed in the first conduit portion 82*a*, and a second lower nozzle water supply port 84*b*1 and a second upper nozzle water supply port 84*b*2 are formed in the second conduit portion 82*b*.

The conduit portion 82 is disposed outside the channel 60P defined by the gasket 60, and the nozzle 66*a*, 66*b*, 66*c* and 66*d* is formed on the inner circumferential surface of the gasket 60 defining the channel 60P. A plurality of hollows 60*h* are formed in the gasket in the thickness direction of the gasket 60 so as to communicate with the plurality of nozzles 66*a*, 66*b*, 66*c* and 66*d*, respectively. The circulating water is supplied to the nozzles 66*a*, 66*b*, 66*c*, and 66*d* by inserting the plurality of nozzle water supply ports 84*a*1, 84*a*2, 84*b*1, 84*b*2 to the plurality of hollows 60*h*.

Referring to FIG. 10, each of the nozzles 66*a*, 66*b*, 66*c* and 66*d* includes a nozzle inflow conduit 661 which is protruded from the inner circumferential surface of the gasket 60 and a nozzle head 662 which communicates with the nozzle inflow conduit 661. The nozzle inflow conduit 661 is preferably protruded from the inner circumferential surface of the extension portion 650. More preferably, the nozzle inflow conduit 661 is protruded from the inner circumferential surface of the outer diameter portion 644. Meanwhile, a port insertion conduit 64*a*, 64*b*, 64*c*, and 64*d* may be protruded from the outer circumferential surface of the outer diameter portion 644. The water discharged from the nozzle water supply port 84*a*, 84*b*, 84*c* and 84*d* is guided to the nozzle head 662 through the nozzle inflow conduit 661 to be sprayed.

The first to fourth port insertion conduits 64*a*, 64*b*, 64*c* and 64*d* may be protruded in the outer direction of the gasket 60 on the outer circumferential surface 61 of the gasket 60 so as to correspond to the four nozzle water supply ports 84*a*1, 84*a*2, 84*b*1, 84*b*2 respectively, and the four nozzle water supply ports 84*a*1, 84*a*2, 84*b*1, 84*b*2 may be inserted and coupled to the first to fourth port insertion conduits 64*a*, 64*b*, 64*c* and 64*d* respectively. The port insertion conduits 64*a*, 64*b*, 64*c* and 64*d* are in communication with the nozzle inflow conduit 661 and define the hollow 60*h* together with the nozzle inflow conduit 661.

The inner circumferential surface 62 of the gasket 60 is provided with first to fourth nozzles 66*a*, 66*b*, 66*c*, and 66*d* communicating with the first to fourth port insertion conduits 64*a*, 64*b*, 64*c*, and 64*d*, respectively. In an embodiment of the present invention, the first to fourth nozzles 66*a*, 66*b*, 66*c*, and 66*d* are integrally formed with the gasket 60. Alternatively, the nozzles may be formed of a separate component from the gasket 60 and may be coupled to the gasket 60, or may be coupled to the first to fourth port insertion conduits 64*a*, 64*b*, 64*c*, and 64*d* through a separate flow path connecting member (not shown) in a state of being separated from the gasket 60.

The nozzles 61*a*, 66*b*, 66*c*, and 66*d* may be provided in both sides based on the channel 60P, and are, preferably, when viewed from the front, disposed symmetrically with respect to a vertical line OV passing through the center of the gasket 60. Hereinafter, when viewed from the front, the nozzle 66*a*, 66*b* disposed in the left side with respect to the vertical line OV is referred to as a first nozzle 66*a*, 66*b*, one of the two first nozzles 66*a* and 66*b*, which is positioned in a relatively upper side, is referred to as a first upper nozzle 66*a*, and the other, which is positioned in a lower side, is referred to as a first lower nozzle 66*b*.

Similarly, the nozzle 66*c*, 66*d* disposed in the right side (or a second area) with respect to the vertical line OV is referred to as a second nozzle 66*c*, 66*d*, one of the two second nozzles 66*c* and 66*d*, which is positioned in a relatively upper side, is referred to as a second upper nozzle 66*c*, and the other, which is positioned in a lower side, is referred to as a second lower nozzle 66*d*.

Based on a vertical line OV to which the center C of the drum 40 belongs, when dividing the vertical plane into left and right sides to define a first area and a second area, the first upper nozzle 66*a* may be disposed in the first area to spray water downward toward the second area. In addition, the second upper nozzle 66*c* may be disposed in the second area to spray water downward toward the first area.

The first lower nozzle 66*b* may be disposed, below the first and second upper nozzles, in the first area and may spray water upward toward the second area. In addition, the second lower nozzle 66*d* may be disposed, below the first and second upper nozzles, in the second area to spray water upward toward the first area.

First to fourth protrusions 65*a* to 65*d* may protrude from the inner circumferential surface 62 of the gasket 60 toward the inside of the gasket 60, and the first to fourth nozzles 66*a*, 66*b*, 66*c*, and 66*d* may be formed in the protrusions 65*a* to 65*d* respectively. Therefore, the circulating water discharged through the nozzle water supply ports 83 and 84 may be sprayed into the drum 40 through the first to fourth nozzles 66*a*, 66*b*, 66*c* and 66*d*.

Figure 11:
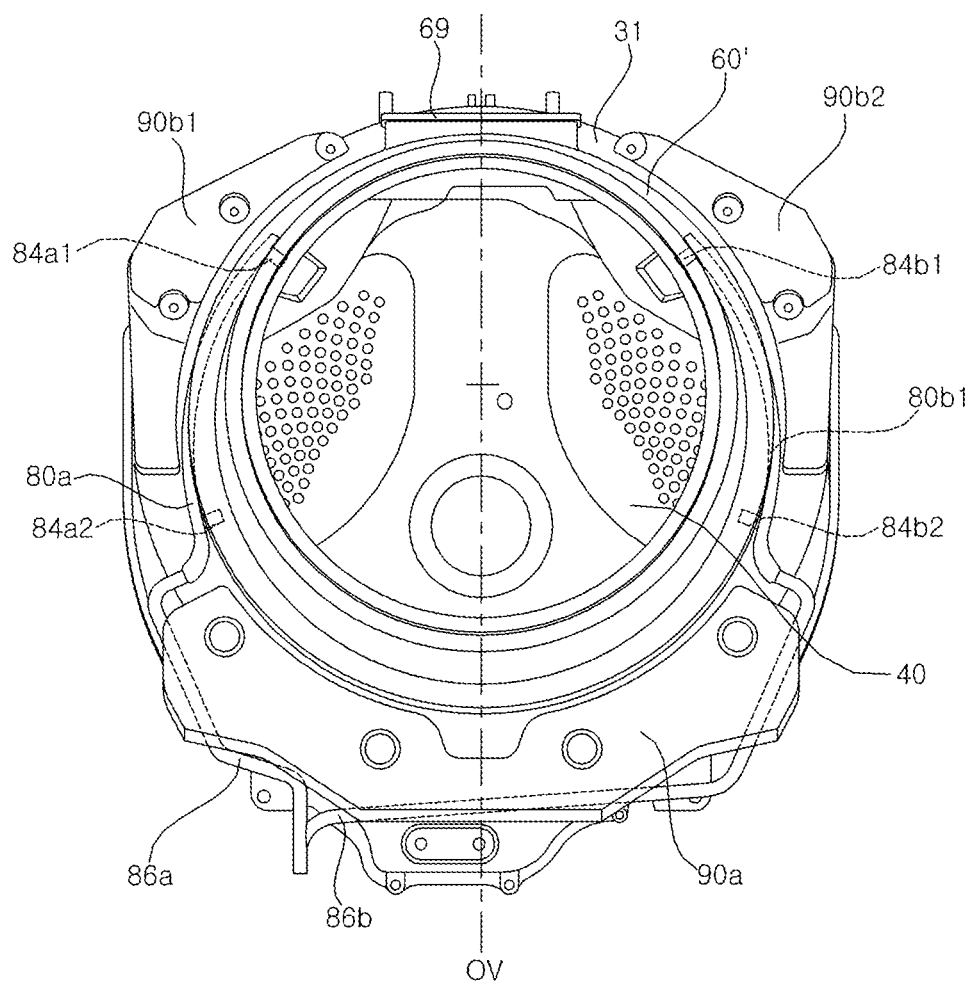
FIG. 11 and FIG. 12 illustrate a part of a laundry treating apparatus according to another embodiment of the present invention.
Figure 12:
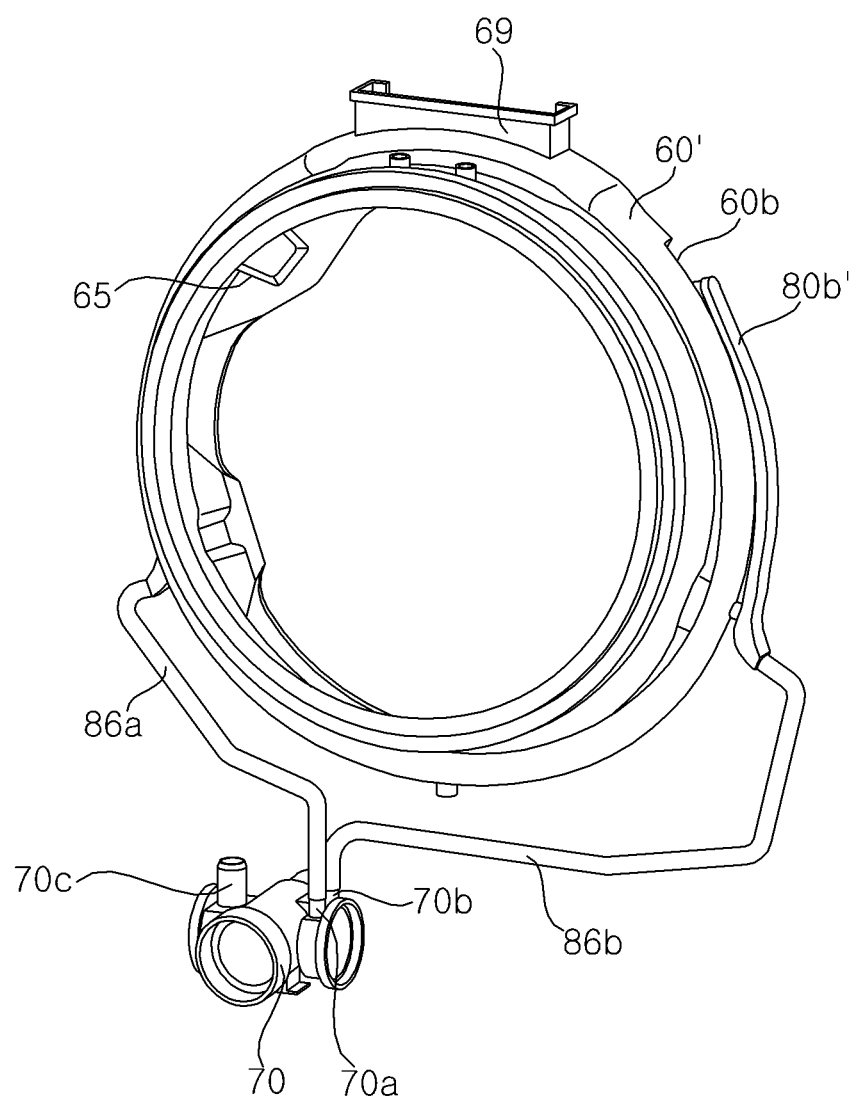
Figure 13:
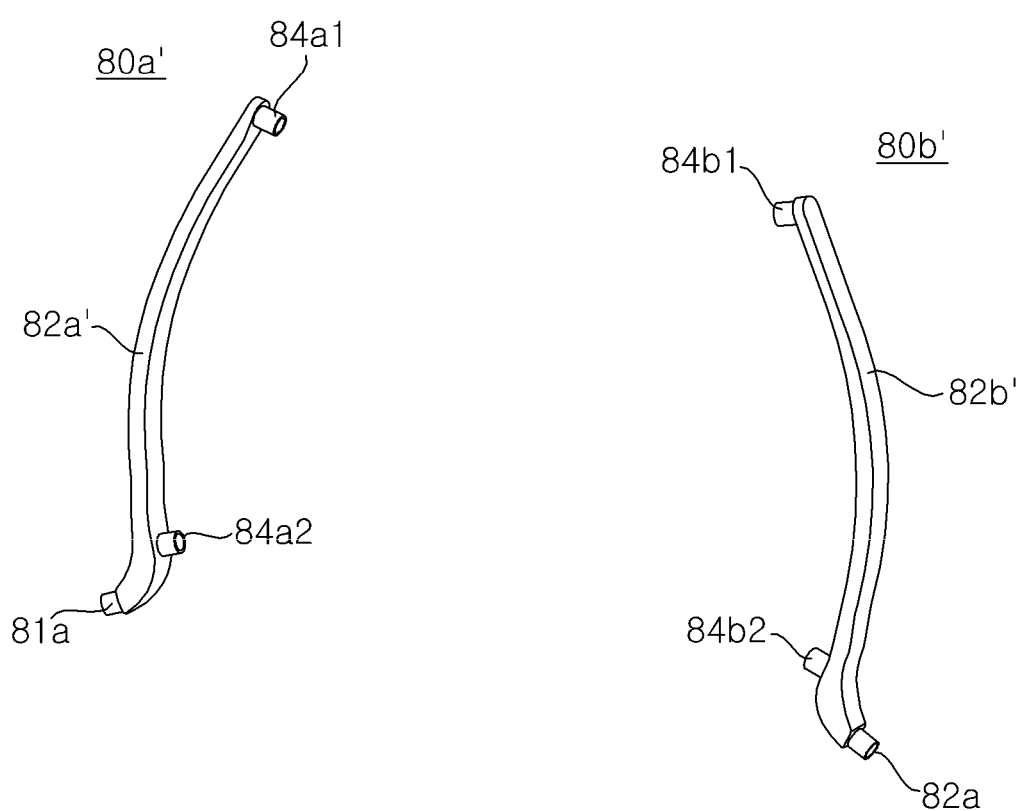
FIG. 13 illustrates a first nozzle water supply conduit and a second nozzle water supply conduit shown in FIG. 11.

FIG. 11 and FIG. 12 illustrate a part of a laundry treating apparatus according to another embodiment of the present invention. FIG. 13 illustrates a first nozzle water supply conduit and a second nozzle water supply conduit shown in FIG. 11. Hereinafter, the same reference numerals are assigned to the same components as those in the above-described embodiment, and the description thereof will be omitted herein.

Referring to FIG. 11 to FIG. 13, the laundry treating apparatus according to another embodiment of the present invention is a washer-and-dryer having a function of blowing air into the tub 30. Such a laundry treating apparatus includes a drying duct (not shown) for guiding air discharged from the tub 30, a heater (not shown) for heating the air in the drying duct (not shown), and an air blowing fan (not shown) for blowing the air in the drying duct (not shown).

First and second upper balancing weights 90*b*1 and 90*b*2, which are fixed to the tub 30 in the upper side of the gasket 60' and disposed in both sides (or both sides of the channel 60P) based on the vertical line OV, may be further included. The first upper balancing weight 90*b*1 and the second upper balancing weight 90*b*2 may be provided in both sides of the air supply duct 69, respectively.

The upper end of a first conduit portion 82*a*' may be positioned between the first upper balancing weight 90*b*1 and the gasket 60. The upper end of a second conduit portion 82*b*' may be positioned between the second upper balancing weight 90*b*2 and the gasket 60'.

The gasket 60' may include an air supply duct 69 communicating with the drying duct and supplying the air blown by the air blowing fan into the tub 30. The air supply duct 69 may protrude outward from the outer circumferential surface 61 of the gasket 60'. The air supply duct 69 may be positioned between the upper end of the first nozzle water supply conduit 80*a* and the upper end of the second nozzle water supply conduit 80*b*.

The upper end of the first conduit portion 82*a* is not coupled to the upper end of the first conduit portion 82*b* (i.e., not a structure in which the conduit portion 82 forms an annular shape), but the upper end of the first conduit portion 82a is closed, the upper end of the second conduit portion 82b is closed, and there exists a gap between the closed upper ends, so that the air supply duct 69 may be disposed in the gap.

Meanwhile, The nozzle water supply conduit 80a', 80b' shown in FIG. 12 is different from the nozzle water supply conduit 80 according to the above-described embodiment only in the position of the circulation conduit connection port 81, and other configurations are substantially the same. In the case of the nozzle water supply conduit 80 according to the embodiment described above, the circulation conduit connection port 81 is extended in a direction substantially perpendicular to the conduit portion 82. However, in the case of the nozzle water supply conduit 80a' and 80b', the circulation conduit connection port 81 is smoothly extended along a certain curve from the lower end of the conduit portion 82'. The nozzle water supply conduit 80a', 80b' may also be applied to the laundry treating apparatus of the embodiment described above with reference to FIG. 1 to FIG. 10.

Figure 14:
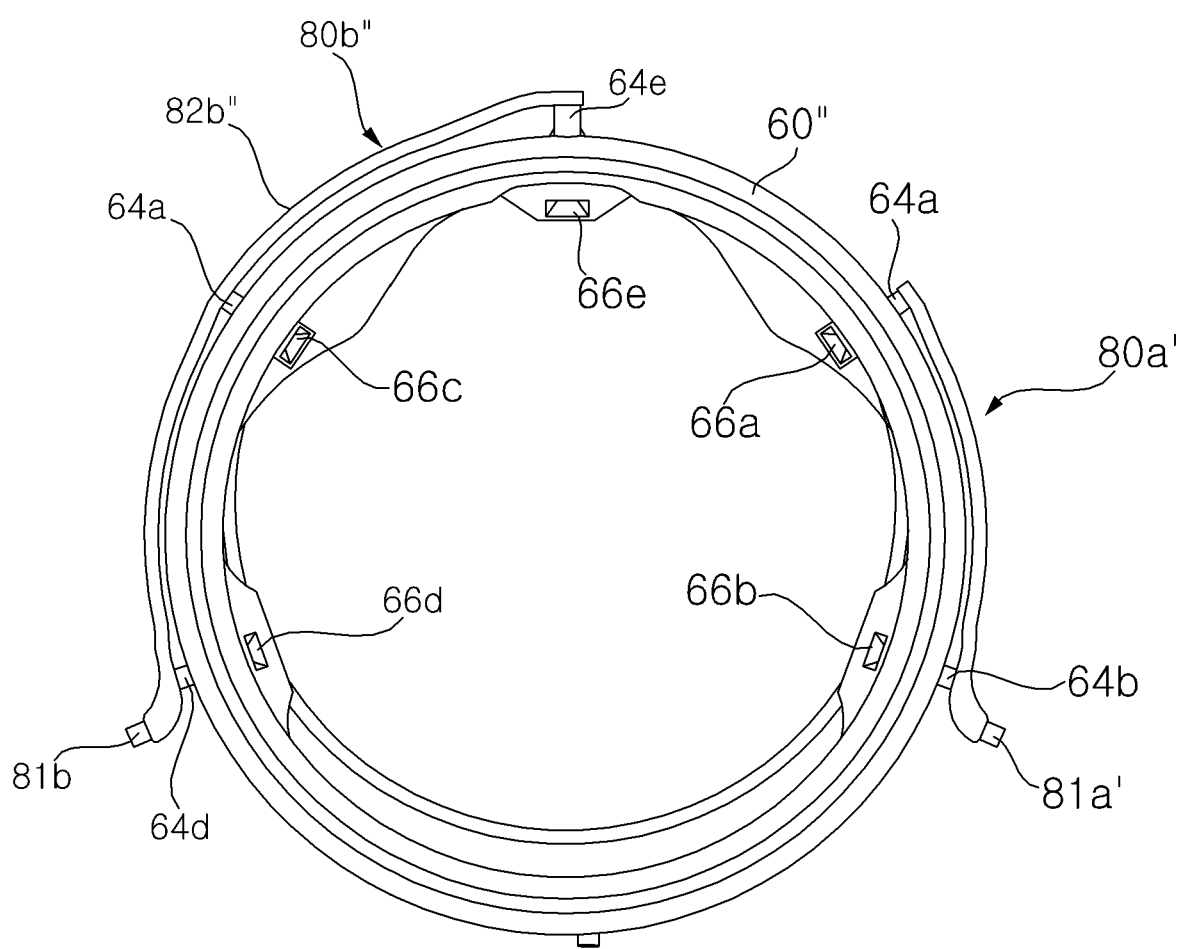
FIG. 14 illustrates a part of a laundry treating apparatus according to another embodiment of the present invention.

FIG. 14 illustrates a part of a laundry treating apparatus according to another embodiment of the present invention. Referring to FIG. 14, a nozzle 66e, which is located higher than the upper nozzle 66a, 66c, may be further formed on the gasket 60". Hereinafter, the nozzle 66e is referred to as highest nozzle 66e. The configuration of the highest nozzle 66e is substantially the same as that of the other nozzles 66a, 66b, 66c and 66d. The port insertion conduit 64e communicated with the highest nozzle 66e may be further formed in the gasket 60". Although not shown, a highest nozzle water supply port (not shown), above the second upper nozzle water supply port 84b1 (see FIG. 13), may be further formed on the second conduit portion 82b". The highest nozzle water supply port may be inserted into the port insertion conduit 64e. The port insertion conduit 64e has substantially the same structure as the other port insertion conduit 64a, 64b, 64c, 64d.

The highest nozzle 66e may receive the circulating water from any one of the pair of nozzle water supply conduits 80a' and 80b". Hereinafter, it is illustrated that the circulating water is supplied to the highest nozzle 66e through the second nozzle water supply conduit 80b".

The second nozzle water supply conduit 80b" is substantially the same as the second nozzle water supply conduit 80b' except that it further includes a highest nozzle water supply port 84b3 above the upper nozzle water supply ports 84a1 and 84b1. The structure of the nozzle water supply port 84b3 is substantially the same as that of the other nozzle water supply ports 84a1, 84a2, 84b1, and 84b2.

That is, in the present embodiment, the circulating water is supplied to five nozzles 66a, 66b, 66c, 66d, and 66e through the first nozzle water supply conduit 80a and the second nozzle water supply conduit 80b, so that the spray direction of the circulating water is more diverse in comparison with the above described other embodiments. More specifically, when the highest nozzle 66e is positioned between (preferably, an intermediate location the first upper nozzle 66a and the second upper nozzle 66c) the first upper nozzle 66a and the second upper nozzle 66c, and when the water flow is sprayed in a triangular shape from each nozzle 66a, 66b, 66c, 66d, the water flow sprayed through five nozzles 66a, 66b, 66c, 66d may achieve a star-shape.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A laundry treating apparatus comprising:
a cabinet having a front surface that defines an input port;
a tub located in the cabinet, the tub having a front surface that defines a tub opening;
a drum located in the tub and configured to rotate relative to the tub;
a gasket that defines a channel extending between the input port of the cabinet and the tub opening;
a plurality of first nozzles located at an inner circumference of the gasket, configured to spray water into the drum, and arranged at a first side with respect to a vertical line passing through a center of the gasket, the plurality of first nozzles including a first upper nozzle disposed above a horizontal line passing through a center of the gasket and a first lower nozzle disposed below the horizontal line;
a pump configured to pump water discharged from the tub, the pump comprising a first circulation port that is configured to discharge water to provide water to the tub;
a first circulation conduit connected to the first circulation port of the pump;
a first conduit portion that is located at the first side with respect to the vertical line and that extends along an outer circumference of the gasket;
a first connection port provided at the first conduit portion and connected to the first circulation conduit; and
a plurality of first nozzle water supply ports that protrude from the first conduit portion, that are coupled to the gasket, and that are connected to the plurality of first nozzles,
wherein the plurality of first nozzle water supply ports includes:
a first upper nozzle water supply port connected to the first upper nozzle, and
a first lower nozzle water supply port connected to the first lower nozzle.

2. The laundry treating apparatus of claim 1, further comprising:
a plurality of second nozzles located at the inner circumference of the gasket and configured to spray water into the drum, the plurality of second nozzles being arranged at a second side with respect to the vertical line opposite to the first side;
a first nozzle water supply conduit that is located at the first side and that includes the first conduit portion, the first connection port, and the plurality of first nozzle water supply ports,
a second nozzle water supply conduit that is located at the second side with respect to the vertical line; and
a second circulation conduit having a first end connected to a second circulation port of the pump that is configured to discharge water to provide water to the tub and a second end connected to the second nozzle water supply conduit, and
wherein the second nozzle water supply conduit includes:
a second connection port connected to the second end of the second circulation conduit;
a second conduit portion that extends from the second connection port along the outer circumference of the gasket; and
a plurality of second nozzle water supply ports that protrude from the second conduit portion toward the gasket, that are coupled to the gasket, and that are connected to the plurality of second nozzles, respectively.

3. The laundry treating apparatus of claim 2, further comprising:
a lower balancing weight coupled configured to couple to the tub and located at a lower side of the gasket, the lower balancing weight extending to each of the first side and the second side with respect to the vertical line,
wherein the first nozzle water supply conduit is located above the lower balancing weight at the first side, and
wherein the second nozzle water supply conduit is located above the lower balancing weight at the second side.

4. The laundry treating apparatus of claim 2, further comprising:
a first upper balancing weight coupled to the tub and located at an upper side of the gasket, the first upper balancing weight being located at the first side with respect to the vertical line, and
wherein an upper end of the first nozzle water supply conduit is positioned between the first upper balancing weight and the gasket.

5. The laundry treating apparatus of claim 4, further comprising:
a lower balancing weight coupled configured to couple to the tub and located at a lower side of the gasket, the lower balancing weight extending to each of the first side and the second side with respect to the vertical line, and
wherein the first connection port is disposed between the first upper balancing weight and the lower balancing weight.

6. The laundry treating apparatus of claim 2, wherein the gasket further comprises an upper nozzle located at the inner circumference of the gasket and configured to spray water into the drum, the upper nozzle being positioned above the plurality of first nozzles, and
wherein the first nozzle water supply conduit further comprises an upper nozzle water supply port that protrudes from the first conduit portion toward the gasket, that is coupled to the gasket, and that is connected to the upper nozzle.

7. The laundry treating apparatus of claim 2, wherein the first nozzle water supply conduit defines a flow path having an inner cross-sectional area that decreases from a lower side of the flow path toward an upper side of the flow path.

8. The laundry treating apparatus of claim 2, wherein the second connection port protrudes from the second conduit portion in a direction away from the gasket and defines an inlet that is configured to communicate with the second circulation conduit.

9. The laundry treating apparatus of claim 2, wherein the plurality of first nozzles are arranged about the center of the gasket and spaced apart from each other along the inner circumference of the gasket,
wherein the plurality of second nozzles are arranged about the center of the gasket and spaced apart from each other along the inner circumference of the gasket, and
wherein the plurality of first nozzles are symmetric to the plurality of second nozzles with respect to the vertical line passing through the center of the gasket.

10. The laundry treating apparatus of claim 2, wherein the gasket comprises:
a plurality of first insertion conduits that protrude from the outer circumference of the gasket, that are located at the first side with respect to the vertical line, and that are configured to receive the plurality of first nozzle water supply ports, respectively; and
a plurality of second insertion conduits that protrude from the outer circumference of the gasket, that are located at the second side with respect to the vertical line, and that are configured to receive the plurality of second nozzle water supply ports, respectively.

11. The laundry treating apparatus of claim 1, wherein the first connection port protrudes from the first conduit portion in a direction away from the gasket and defines an inlet that is configured to communicate with the first circulation conduit.

12. The laundry treating apparatus of claim 11, wherein the pump is disposed below the tub, and
wherein the first connection port is located lower than the plurality of first nozzle water supply ports.

13. The laundry treating apparatus of claim 12, wherein the first connection port extends downward.

14. The laundry treating apparatus of claim 12, further comprising:
an upper balancing weight coupled to the tub and located at an upper side of the gasket,
wherein the first conduit portion has an upper part that defines an upper end of the first conduit portion and from which one of the plurality of first nozzle water supply ports protrude, and
wherein the upper part of the first conduit portion is located between the gasket and the upper balancing weight.

15. The laundry treating apparatus of claim 1, wherein the outer circumference of the gasket defines:
a first seating groove configured to accommodate at least a part of the first conduit portion.

16. The laundry treating apparatus of claim 1, wherein the gasket comprises:
a plurality of first insertion conduits that protrude from the outer circumference of the gasket, that are located at the first side with respect to the vertical line, and that are configured to receive the plurality of first nozzle water supply ports, respectively.

17. The laundry treating apparatus of claim 1, wherein the first circulation conduit is made of an amorphous soft material, and
wherein a hardness level of the first conduit portion is greater than a hardness level of the first circulation conduit.

18. The laundry treating apparatus of claim 1, wherein the first conduit portion has a lower part extending from a lower end of the first conduit portion in a direction away from the vertical line passing through the center of the gasket, and
wherein the first connection port protrudes from the lower part of the first conduit portion.

19. The laundry treating apparatus of claim 1, wherein the first conduit portion has a curved portion between the first upper nozzle water supply port and the first lower nozzle water supply port.

20. The laundry treating apparatus of claim 1, wherein a first angle between the first lower nozzle water supply port and a portion of the first conduit portion that is disposed upstream of the first lower nozzle water supply port is less than a second angle between the first upper nozzle water supply port and a portion of the first conduit portion that is disposed upstream of the first upper nozzle water supply port.

* * * * *